United States Patent [19]

Takeuchi

[11] 3,991,254
[45] Nov. 9, 1976

[54] HIGH TEMPERATURE INSULATING STRUCTURE

[75] Inventor: Yukihisa Takeuchi, Aichi, Japan

[73] Assignee: Nippondenso Co., Ltd., Japan

[22] Filed: Mar. 8, 1974

[21] Appl. No.: 449,436

[30] Foreign Application Priority Data

| | | |
|---|---|---|
| Mar. 10, 1973 | Japan | 48-28423 |
| Apr. 11, 1973 | Japan | 48-41564 |
| Jan. 11, 1974 | Japan | 49-6797 |

[52] U.S. Cl. ............... 428/309; 106/40 R; 106/62; 252/62; 264/30; 264/43; 264/44; 428/310; 428/446; 428/454; 428/539; 428/920

[51] Int. Cl.² ............ C04B 9/06; C04B 35/10; C04B 35/18

[58] Field of Search ............ 106/40 R, 62; 264/30, 264/43, 44; 161/182; 252/62; 428/920, 538, 539, 446, 450, 454, 309, 310

[56] References Cited

UNITED STATES PATENTS

| | | | |
|---|---|---|---|
| 2,124,865 | 7/1938 | Winkler et al. | 264/30 |
| 2,348,395 | 5/1944 | Larson | 264/30 |
| 2,893,888 | 7/1959 | Yarotsky | 264/30 X |
| 2,949,704 | 8/1960 | Jacobs | 52/612 |
| 3,048,481 | 8/1962 | Eastman | 264/30 |
| 3,275,721 | 9/1966 | Leroy et al. | 264/43 X |
| 3,318,723 | 5/1967 | Troell et al. | 264/30 X |
| 3,357,842 | 12/1967 | Bowman | 264/30 X |
| 3,468,750 | 9/1969 | Pfeifer et al. | 161/191 |
| 3,837,630 | 9/1974 | Kohl et al. | 264/30 X |
| 3,839,517 | 10/1974 | Maine | 106/40 R |
| 3,875,271 | 4/1975 | Martin | 264/43 |
| 3,885,977 | 5/1975 | Lachman et al. | 106/62 |
| 3,891,734 | 6/1975 | Chauvin | 269/43 |
| 3,892,580 | 7/1975 | Messing | 106/40 R |
| 3,940,276 | 2/1976 | Wilson | 106/62 |

FOREIGN PATENTS OR APPLICATIONS

46,230   2/1970   Germany

*Primary Examiner*—Harold Ansher
*Attorney, Agent, or Firm*—Cushman, Darby & Cushman

[57] ABSTRACT

A high temperature insulating structure adapted for use in a vibratile structure such as a manifold reactor or the like for automobiles, said structure consisting of two walls defining therebetween a space filled with heat insulating material, said material being formed by firing a slurry prepared by mixing a water solution of a phosphate compound and a heat resisting material consisting of 20 – 70 % by weight of silicon dioxide, 15 – 80 % by weight of aluminium oxide, and 0 – 30 % by weight of magnesium oxide.

12 Claims, 18 Drawing Figures

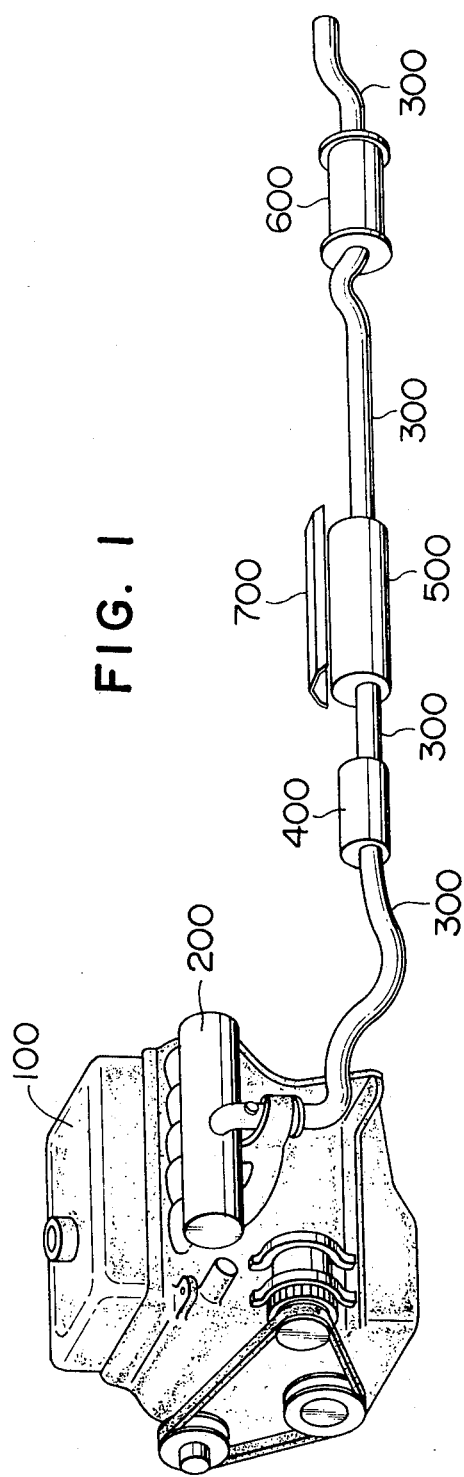
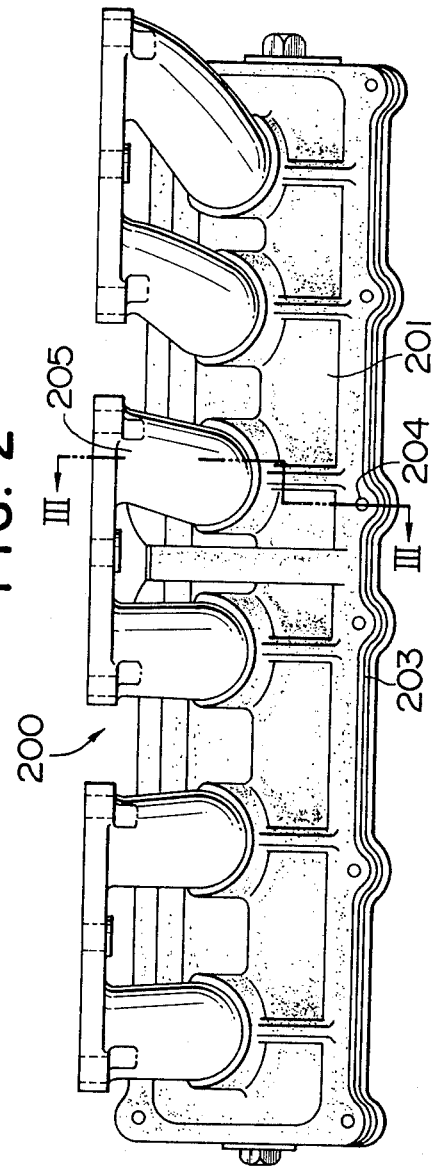

HIGH TEMPERATURE INSULATING STRUCTURE

The present invention relates to a high temperature insulating structure having heat resisting and insulating properties in which there is formed a space between inner and outer walls of a double structure comprising said inner and outer walls, and there is provided in said space a ceramic insulating layer consisting of a heat resisting material consisting of aluminum oxide [$Al_2O_3$] (hereunder referred to as "alumina"), silicon dioxide [$SiO_2$] (hereunder referred to as "silica"), and magnesium oxide [$MgO$] (hereunder referred to as "magnesia"), and a phosphate compound.

Heretofore, in the insulating structures incorporated in moving equipment such as automobiles, motorcycles, and the like, where vibration stress is produced and acts on said structures at high temperatures of more than 500° C, an insulating layer has been utilized which is formed by using ceramic fiber or by applying an effervescent slurry on the insulating sections to take advantage of the effect of effervescence.

In the case of an insulating structure employing ceramic fibers, when the insulating structure is used for a lengthy period of time with vibrations being applied thereto, a portion of the insulating structure tends to pulverize and cavities are very likely to be formed in the insulating layer resulting in a degradation in insulating property. If ceramic fibers is used for the insulating layer in a manifold reactor and the like, thermal stress due to temperature change is applied repeatedly to the insulating layer to destroy the welded portions of an iron plate structure supporting the insulating layer. As a result, the ceramic fibers are sucked through these destroyed portions into the exhaust gas so that various hazards such as the clogging of the by-pass valve for the catalyst convertor and of the valves for the exhaust gas recirculating system (EGR) are produced.

In case an effervescent slurry is aplied to the insulating sections to form an insulating layer by utilizing the effervescing action of the slurry, if vibrations are transmitted to the insulating layer, the dried slurry peels off the insulating sections to cause a rapid lowering of the insulating property.

There has been used an insulating structure similar to that of the present invention in which the insulating structure (a double structure composed of iron plates) is filled with a ceramic in the form of a slurry and the ceramic is dried to solidify the same. But since said ceramic in the form of a slurry has a low fluidity, a uniform insulating layer cannot be formed when said ceramic is employed in manufacturing a thin insulating layer for use with such a structure as an exhaust gas purifying system for automobiles, which is very complicated in construction. In addition, such an insulating material has a large specific gravity and its insulating property is inferior.

The present invention provides a light-weight insulating structure having a vibration resisting property in which spaces in various insulating structures are filled uniformly with a slurry having a high fluidity, and the slurry is heated to expand and solidify the same so that strong insulating layers firmly fused to said insulating structures are formed, and which can be used, for instance, in automobiles for their exhaust pipes, manifold reactors, catalyst convertors, and insulating covers.

In manufacturing the insulating structure in accordance with the present invention, a heat resisting material consisting of 20 – 70% by weight of silica, 15 – 80% by weight of alumina, and 0 – 30% by weight of magnesia, such as cordierite [$Mg_2Al_3(Si_4Al_3)O_{18}$], mullite [$3Al_2O_3.2SiO_2$], sillimanite [$Al_2O_3.SiO_2$], and kaolin [$Al_2O_3.2SiO_2$], which are indicated by the shaded area in FIG. 13, is mixed in a water solution of a phosphate compound, for example aluminium primary phosphate [$Al(H_2PO_4)_3$], to prepare a base slurry. If necessary, to this base slurry is added an acid and a substance which gives a gas on reaction with the acid. Instead of said acid and said substance, a material which loses its volume at high temperatures may be dispersed in the base slurry. Further, instead of the acid, substance, and material mentioned above, a light-weight aggregate may be mixed in the base slurry. The space in the double structure is filled with the slurry thus prepared by simple pouring or filling under pressure or filling under reduced pressure. The filled slurry is heated at a temperature of less than 500° C for the purpose of drying, and is then fired at an elevated temperature to form a ceramic insulating layer.

This ceramic insulating layer is a very superior one which has a low thermal conductivity, an excellent insulating property, a high maximum resistible temperature, a high strength, and a small coefficient of thermal expansion. It has been proven that this ceramic insulating layer is quite useful as a high temperature insulating structure.

The embodiments of the high temperature insulating structure in accordance with the present invention will be described hereunder in detail, with explanations being given as to the results obtained by applying said insulating structure to the exhaust system of an automobile, taing reference to the attached drawings, in which:

FIG. 1 is a schematic view of an exhaust system for automobile showing the usage of the high temperature insulating structure in accordance with the present invention;

FIGS. 2 and 3 are respectively a front view and a sectional view taken along the line III — III (of FIG. 2), which views both illustrate the details of the manifold reactor shown in FIG. 1;

Figure 3:
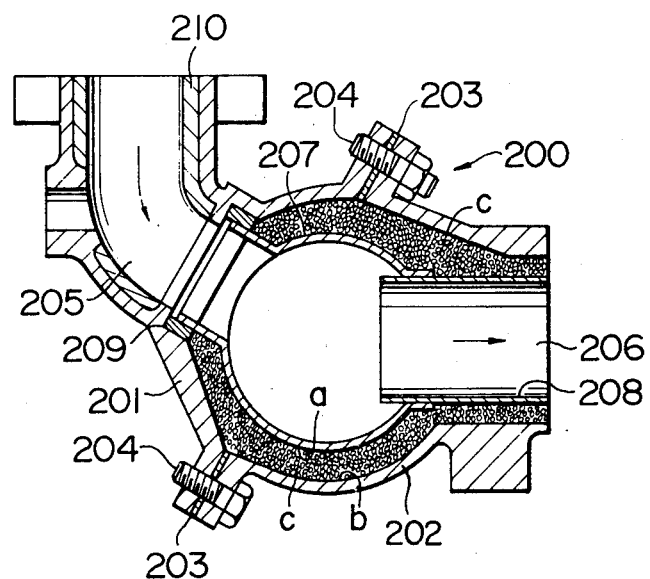

Referring to FIG. 1 showing an exhaust system for automobile, the numerals 100, 200, 300, 400, 500, 600, and 700 respectively indicate an engine, a manifold reactor, a double exhaust pipe, a pre-muffler, a catalyst convertor, a main muffler, and an insulating cover. Turning to FIGS. 2 and 3 illustrating the details of said manifold reactor 200, the numerals 201 and 202 designate casting cases connected to each other by means of bolts 204 with packings 203 being arranged therebetween. The numerals 205, 206, 207, 208, 209, and 210 are respectively a suction port formed in the case 201, a discharge port, an inner core located inside the case 201 and the case 202, a guide for the double exhaust pipe 300 (FIG. 1), which is fixed to the inner core 207 and forms the discharge port 206, a sealing ring, and a port liner lined on the inner surface of the suction port 201. The inner core 207 and the guide 208 constitute an inner wall $a$ of a double structure while the cases 201 and 202 constitute an outer wall $b$ of the double structure. A ceramic insulating layer $c$ is interposed between said inner wall $a$ and said outer wall $b$.

Figure 4:
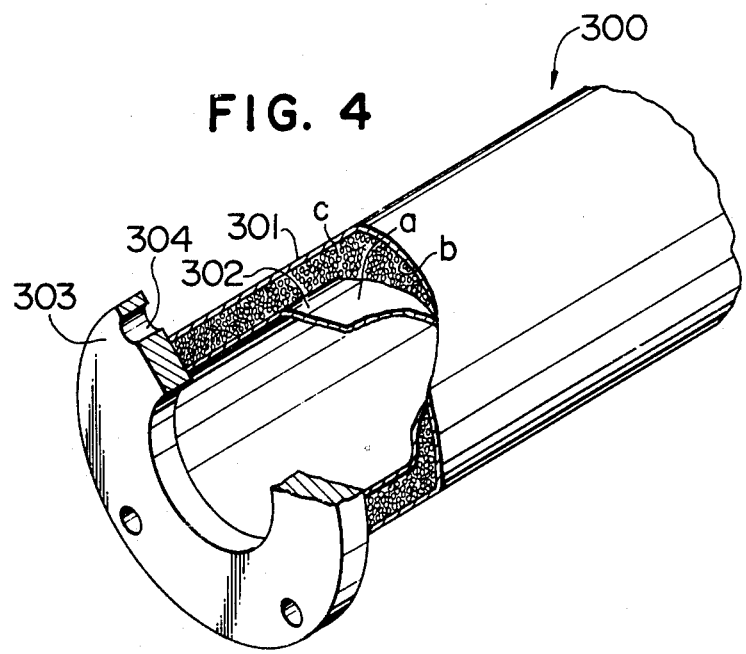
FIG. 4 is a partly sectional perspective view showing the details of the double exhaust pipe illustrated in FIG. 1.

FIG. 4 show the details of said double exhaust pipe 300. In FIG. 4, the numerals 301, 302, 303, and 304 indicate respectively a cylindrical outer case, a cylindrical inner case, a flange, and bolt holes. The inner case 302 constitutes an inner wall $a$ of a double structure while the outer case 301 constitutes an outer wall $b$ of the double structure. A ceramic insulating layer $c$ is interposed between said inner wall $a$ and said outer wall $b$.

Figure 5:
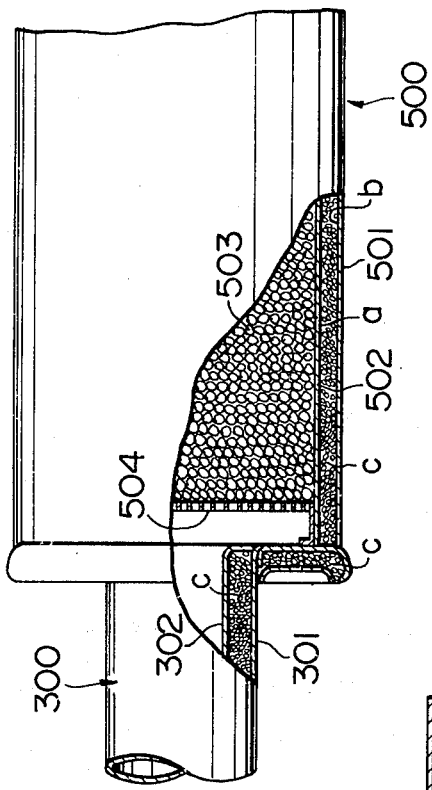
FIG. 5 is a partly sectional front view showing the details of the catalyst convertor illustrated in FIG. 1 in which a granular catalyst is used.

Referring to FIG. 5 showing the details of a catalyst convertor 500 using a granular catalyst, the numerals 501, 502, 503, and 504 designate respectively a cylindrical outer case, a cylindrical inner case, a granular catalyst contained in the inner case 502, and a surrounding plate surrounding the granular catalyst 503 and having a plurality of holes. A double exhaust pipe 300 is connected to this catalyst convertor 500. The inner case 502 constitutes an inner wall $a$ of a double structure while the outer case 501 constitutes an outer wall $b$ of the double structure. A ceramic insulating layer $c$ is interposed between said inner wall $a$ and said outer wall $b$.

Figure 6:
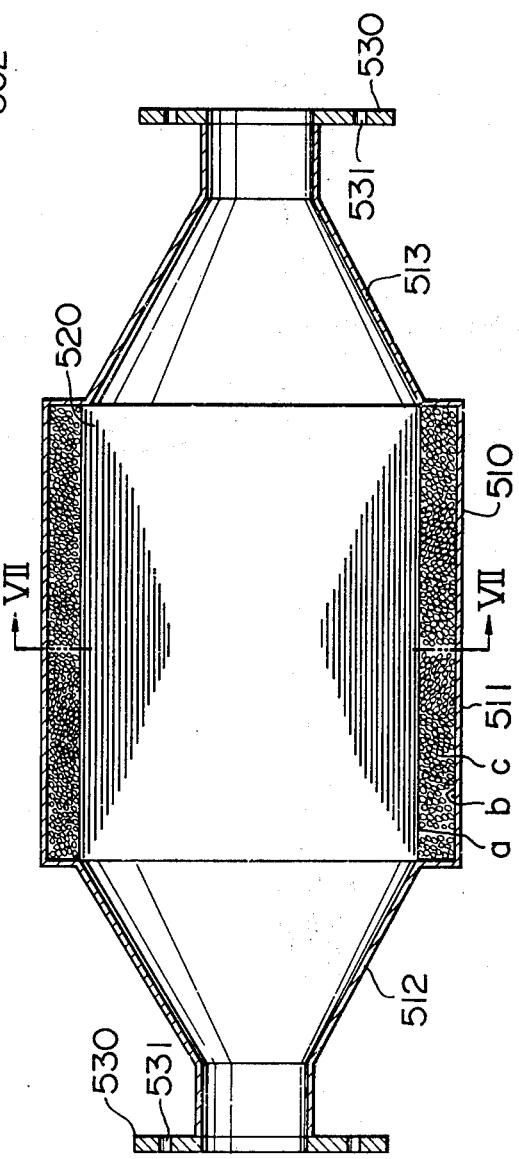
FIGS. 6 and 7 are respectively a sectional front view and a sectional view taken along the line VII — VII (of FIG. 6), which views both show the details of the catalyst convertor of FIG. 1 using a honeycomb-shaped catalyst.
Figure 7:
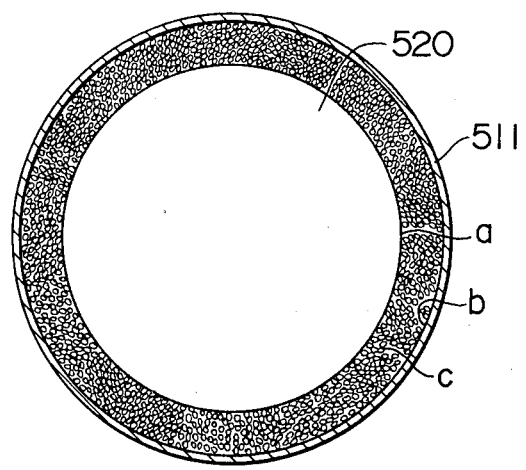

FIGS. 6 and 7 show the details of another example of the catalyst convertor 500 which uses a honeycomb-shaped catalyst. In FIGS. 6 and 7, the numeral 510 indicates a case comprising a cylindrical honeycomb container 511 and cones 512 and 513 provided at the both ends of said honeycomb container 511. The numeral 520 designates a cylindrical and honeycomb-shaped catalyst contained in the honeycomb container 511 of the case 510. The numerals 530 and 531 indicate respectively a flange and bolt holes. The outer peripheral surface of the honeycomb-shaped catalyst 520 constitutes an inner wall $a$ of a double structure while the honeycomb container 511 in the case 510 constitutes an outer wall $b$ of the double structure. A ceramic insulating layer $c$ is interposed between said inner wall $a$ and said outer wall $b$.

Figure 8:
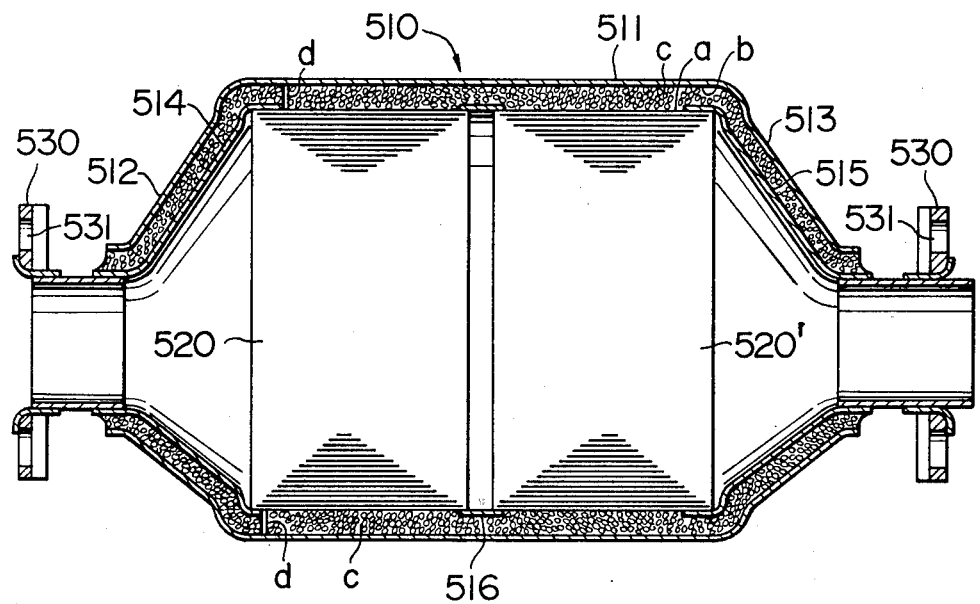
FIG. 8 is a sectional front view illustrating another example of the catalyst convertor shown in FIGS. 6 and 7.

FIG. 8 shows the details of a further example of the catalyst convertor 500. The catalyst convertor 500 of FIG. 8 differs from that illustrated in FIGS. 6 and 7 in that two honeycomb-shaped catalysts 520 and 521 are used, and that inner cones 514 and 515 are arranged inside cones 512 and 513. A cylindrical plate 516 is securely fixed between the outer peripheral ends of the catalysts 520 and 521. The outer peripheries of the catalysts 520 and 521, the inner cones 514 and 515, and the plate 516 constitute an inner wall $a$ of a double structure, while the case 510 constitutes an outer wall $b$ of the double structure. A ceramic insulating layer $c$ is interposed between said inner wall $a$ and said outer wall $b$. The ceramic insulating layer $c$ is divided into two parts and a space $d$ is formed therebetween.

Figure 9:
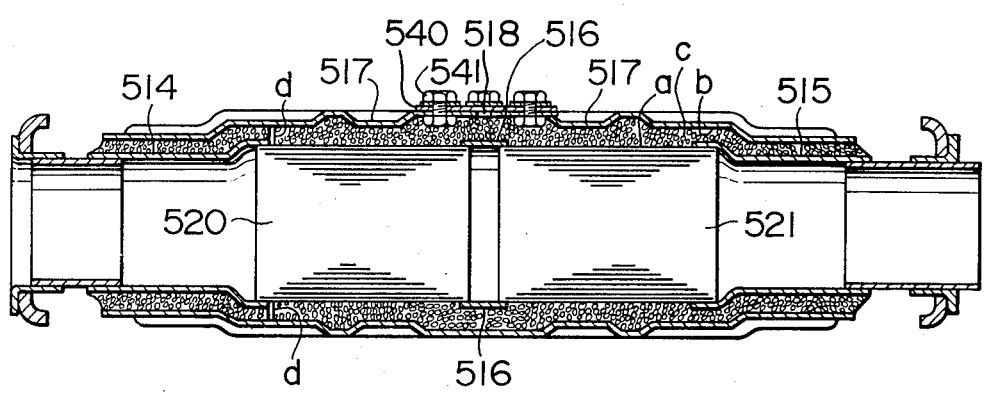
FIG. 9 is a sectional front view showing a further example of the catalyst convertor illustrated in FIGS. 6 and 7.

FIG. 9 shows the details of a further example of the catalyst convertor 500. The catalyst convertor 500 of FIG. 9 differs from that of FIG. 8 in that a plurality of dents 517 are provided on a case 510. The numeral 518 designates a hole in the case 510, through which slurry is poured. After the slurry has been poured through the hole 518, a cover 540 is fastened to the catalyst convertor by means of bolts 541 to close the hole 518. The outer peripheries of catalysts 520 and 521, inner connes 514 and 515, and a plate 516 constitute an inner wall $a$ of a double structure, while the case 510 constitutes an outer wall of the double structure. A ceramic insulating layer is interposed between said inner wall $a$ and said outer wall.

Figure 10:
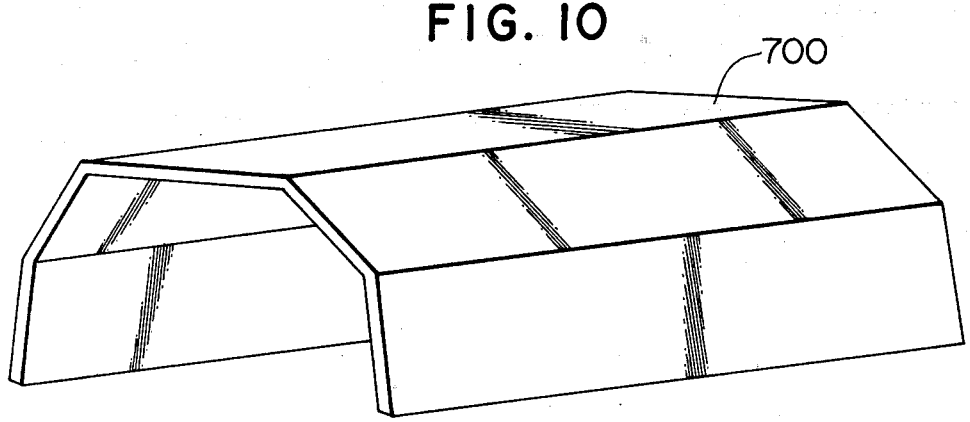
FIGS. 10 and 11 are respectively a perspective view and a sectional front view, which views both show the details of the insulating cover illustrated in FIG. 1.
Figure 11:
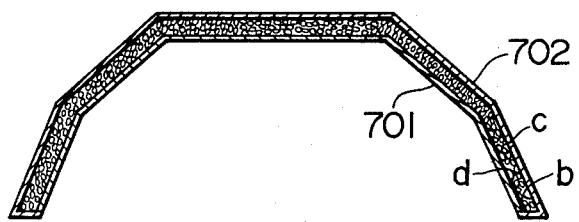

Turning to FIGS. 10 and 11 showing the details of an insulating cover 700, an inner case 701 constitutes an inner wall $a$ of a double structure, while an outer case 702 constitutes an outer wall $b$ of the double structure. A ceramic insulating layer $c$ is interposed between said inner wall $a$ and said outer wall $b$.

EMBODIMENT 1

Heat resisting materials each consisting of mullite, sillimanite, and kaolin were separately mixed in a water solution of aluminium primary phosphate to prepare slurries. The slurries produced had the following compositions:

| Composition | (weight percent) |
|---|---|
| A heat resisting material | 50 – 75% |
| A 50% water solution of aluminium primary phosphate | 25 – 50% |

By simple pouring, the spaces between the inner walls $a$ and the outer walls $b$ of the double structures were filled with the slurries thus prepared, and the slurries were fired to form ceramic insulating layers $c$. Table 1 shows the properties of the ceramic insulating layers $c$ produced in this manner. In case mullite was used as the heat resisting material, the maximum resistible temperature and the coefficient of thermal expansion of the insulating layer were respectively 1300° C and $4.7 - 5.3 \times 10^{-6}$. The insulating layer also had excellent strength. Thus, the ceramic insulating layer using mullite is particularly useful principally as an insulating structure for use with the manifold reactor 200 which requires a superior vibration resisting property and a high strength because it is directly subjected to the vibrations of the engine 100. The ceramic insulating layers using sillimanite and kaolin as the heat resisting material showed the same excellent results as those obtained by the ceramic insulating layer using mullite.

Table 1

| Heat resist-ing material | Properties of Ceramics | | | |
|---|---|---|---|---|
| | Thermal conductivity (Kcal/m.hr. °C) | Maximum resistible temperature (°C) | Coefficient of thermal expansion | Density g/m$^3$ |
| Mullite | 0.5 – 0.7 | 1300 | 4.7 – 5.3 ($\times 10^{-6}$) | 1.3 – 1.7 |
| Sillimanite | 0.5 – 0.7 | 1300 | 4.8 – 5.0 ($\times 10^{-6}$) | 1.2 – 1.5 |
| Kaolin | 0.4 – 0.7 | 1000 | 4.8 – 5.0 ($\times 10^{-6}$) | 1.3 – 1.6 |

EMBODIMENT 2

Heat resisting materials each consisting of mullite, sillimanite, and kaolin were separately mixed in a water solution of aluminium primary phosphate using the same mixing ratios as in Embodiment 1 to prepare slurries. To each slurry was added less than 10% by weight of one or more acids selected from the group consisting of such common acids as phosphoric acid, hydrochloric acid, and sulfuric acid. Subsequently, to effect effervescence, in each slurry was uniformly dispersed less than 1 % by weight of a powdery metal which yielded hydrogen on chemical reaction with the acids mentioned above and which had been selected from the group consisting of such metals as aluminum, iron, calcium, magnesium, manganese, nickel, tin, and cadmium. The spaces between the inner walls a and the outer walls b of the double structures were filled with the slurries thus rendered effervescent, and the slurries were fired to form ceramic insulating layers c. The insulating layers manufactured in this manner were porous. Table 2 shows the properties of these insulating layers. In case mullite was used as the heat resisting material, the maximum resistible temperature and the coefficient of thermal expansion of the insulating layer were respectively 1300° C and 4.7 – 5.3 × 10$^{-6}$, which values being the same as those obtained in Embodiment 1. On the other hand, the tested insulating layer had a slightly lower strength than the insulating layers of Embodiment 1, but had a thermal conductivity of 0.3 – 0.6 Kcal/mH° C which was lower than those obtained in Embodiment 1. Thus, this ceramic insulating layer is particularly useful as an insulating structure for use with the double exhaust pipe 300, the mufflers 400 and 600, and the insulating cover 700 which are complicated in shape and construction and require a superior insulating property and medium degree of strength. The ceramic insulating layers using sillimanite and kaolin as the heat resisting material showed the same excellent results as those obtained by the ceramic insulating layer using mullite.

EMBODIMENT 3

Heat resisting materials each consisting of mullite, sillimanite, and kaolin were separately mixed in a water solution of aluminium primary phosphate using the same mixing ratios as in Embodiment 1 to prepare slurries. To each slurry was added less than 10 % by weight of one or more acids selected from the groups consisting of such common acids as phosphoric acid, hydrochloric acid, and sulfuric acid. Subsequently, to effect effervescence, in each slurry was uniformly dispersed less than 1 % by weight of a compound which yielded carbon dioxide on chemical reaction with the acids mentioned above and which had been selected from the group consisting of such compounds as calcium carbonate, calcium hydrogen carbonate, sodium carbonate, and magnesium carbonate. The spaces between the inner walls a and the outer walls b of the double structures were filled with the effervesced slurries, and the slurries were fired to form porous ceramic insulating layers c. These ceramic insulating layers had the same properties as those of the insulating layers of Embodiment 2.

EMBODIMENT 4

Heat resisting materials each consisting of mullite, sillimanite, and kaolin were separately mixed in a water solution of aluminium primary phosphate using the same mixing ratios as in Embodiment 1 to prepare slurries. To each slurry was added less than 10 % by weight of one or more acids selected from the group consisting of such common acids as phosphoric acid, hydrochloric acid, and sulfuric acid. Subsequently, to effect effervescence, in each slurry was uniformly dispersed less than 1 % by weight of a powdery metal which yielded hydrogen on chemical reaction with the acids mentioned above and which had been selected from the group consisting of such metals as aluminum, iron, calcium, magnesium, manganese, nickel, tin, and cadmium, or less than 1 % by weight of a compound which yielded carbon dioxide on chemical reaction with the acids mentioned above and which had been selected from the group consisting of such compounds as calcium carbonate, calcium hydrogen carbonate, sodium carbonate, and magnesium carbonate. Then, to each effervescent slurry was added less than 5 % by weight of a commercial bubble stabilizer such as corn starch, yolk, cellulose acetate, dry blood, IBIT (trade name), and the like. The spaces between the inner walls a and the outer walls b of the double structures were filled with the slurries thus prepared, and the Table 2

| Ceramic | Properties of Ceramics | | | |
|---|---|---|---|---|
| | Thermal conductivity (Kcal/m.hr. °C) | Maximum resistible temperature (°C) | Coefficient of thermal expansion | Density g/cm$^3$ |
| Mullite | 0.3 – 0.6 | 1300 | 4.7 – 5.3 ($\times 10^{-6}$) | 0.7 – 1.0 |
| Sillimanite | 0.3 – 0.6 | 1300 | 4.8 – 5.0 ($\times 10^{-6}$) | 0.6 – 1.0 |
| Kaolin | 0.3 – 0.6 | 1000 | 4.8 – 5.0 ($\times 10^{-6}$) | 0.7 – 1.0 | slurries were fired to form porous ceramic insulating layers c. The bubble stabilizer retarded the speed of effervescence and stabilized the bubbles so that the effervescence was effected in a uniform manner. The insulating layers produced this way had properties substantially the same as those of the insulating layers of Embodiment 2.

EMBODIMENT 5

Heat resisting materials each consisting of mullite, sillimanite, and kaolin were separately mixed in a water solution of aluminium primary phosphate using the same mixing ratios as in Embodiment 1 to prepare slurries. Then, in each slurry was uniformly dispersed less than 15 % by weight of a material which, upon the solidification of slurry, burned and disappeared (or lost its volume if it did not burn), such as crumpled small paper balls, sawdust or wood chips, spheres of synthetic resins, spheres of synthetic organic substances, and the like. The spaces between the inner walls a and the outer walls b of the double structures were filled with the slurries thus prepared, and the slurries were fired to form porous ceramic insulating layers c. During the firing, said material such as small paper balls, sawdust or wood chips, synthetic resins, organic substances, and the like, which was included in the slurries, burned and lost its volume, so that the slurries were transformed into porous ceramic insulating layers. The insulating layers produced in this manner had the same properties as those of the insulating layers of Embodiment 2.

EMBODIMENT 6

Figure 12:
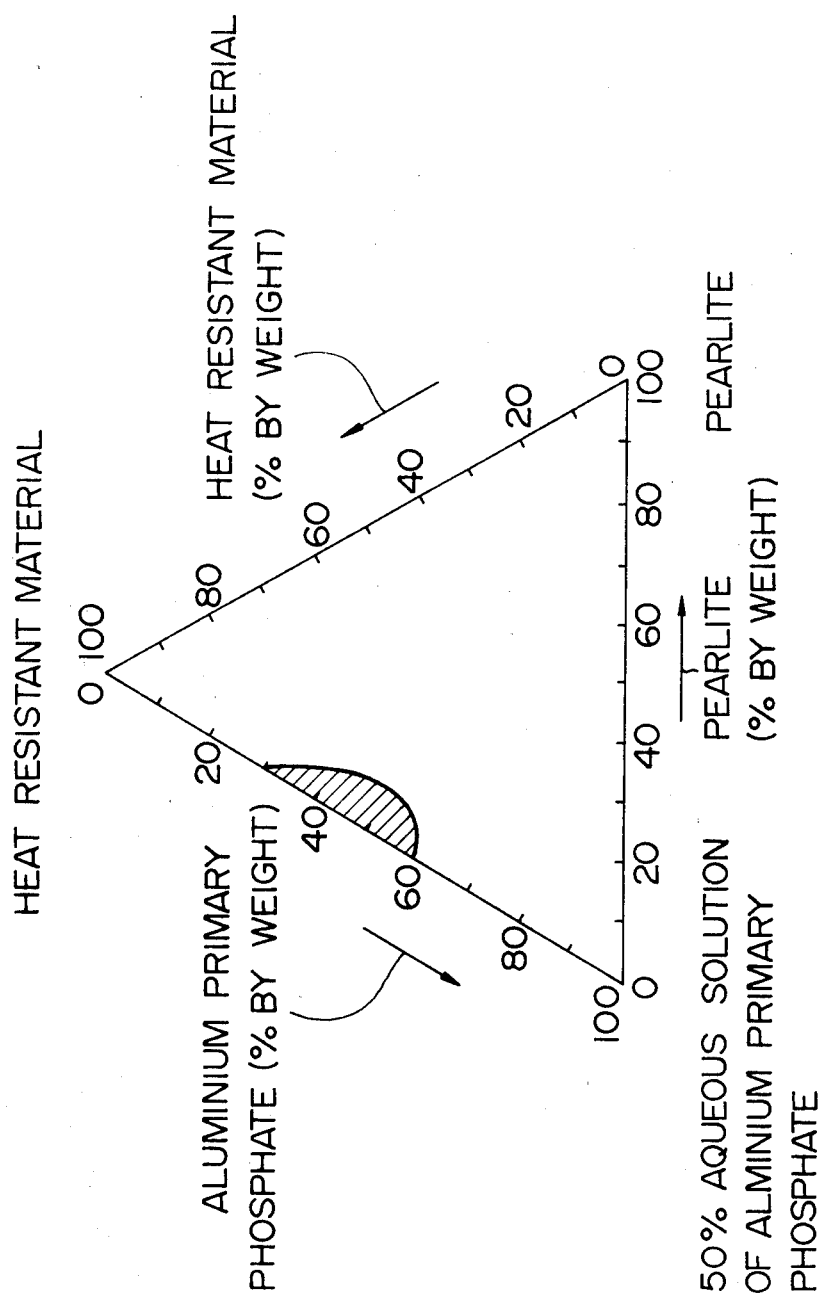
FIG. 12 is a composition diagram for an embodiment of the insulating structure in accordance with the present invention.

Heat resisting materials each consisting of mullite, sillimanite, and kaolin were separately mixed in a water solution of aluminium primary phosphate (water content 40 – 60%), and to the mixtures thus formed was added a light-weight aggregate such as perlite (effervesced perlite), effervesced obsidian, and the like, so that there were prepared slurries having the compositions shown in the shaded area in FIG. 12. The spaces between the inner walls a and the outer walls b of the double structures were filled with the slurries thus prepared, and the slurries were fired to form ceramic insulating layers. These ceramic insulating layers were porous. In case mullite was used as the heat resisting material, the maximum resistible temperature and the coefficient of thermal expansion of the insulating layer were respectively more than 1100° C and $4.8 - 5.3 \times 10^{-6}$. The insulating layer had a strength which was substantially the same as those of the insulating layers of Embodiment 1, and had a thermal conductivity of 0.3 – 0.6 Kcal/mH° C which was the same as those obtained in Embodiments 2 through 5. Thus, this ceramic insulating layer is particularly useful as an insulating structure for use with the catalyst convertor 500 (both the granular catalyst type and the honeycomb-shaped catalyst type) which requires a high strength and a superior insulating property. It was observed that the ceramic insulating layers using sillimanite and kaolin as the heat resisting material had the same excellent properties as those of the ceramic insulating layer using mullite.

EMBODIMENT 7

New slurries were prepared by adding to the slurries having the compositions of Embodiment 6 the acid or acids and the metal powder reacting with said acid to yield hydrogen which were used in Embodiment 2, or the acid or acids and the compound reacting with said acid to yield carbon dioxide which were used in Embodiment 3, or the bubble stabilizer used in Embodiment 4, or the material used in Embodiment 5, which lost its volume upon the solidification of slurry. The spaces between the inner walls a and the outer walls b of the double structures were filled with the slurries thus prepared, and the slurries were fired to form ceramic insulating layers c. Said substances and materials added to the slurries promoted the attainment of porosity in the ceramic insulating layers. These insulating layers had the same properties as those of the insulating layers of Embodiment 6.

EMBODIMENT 8

Cordierite was mixed in a water solution of aluminium primary phosphate to prepare a slurry. The slurry produced had the following compositions:

| Composition | (weight percent) |
|---|---|
| Cordierite | 50 – 70% |
| A 50% water solution of aluminium primary phosphate | 30 – 50% |

By simple pouring, the space between the inner wall a and the outer wall b of the double structure was filled with the slurry thus prepared, and the slurry was fired to form a ceramic insulating layer c. This ceramic insulating layer had a thermal conductivity of 0.5 – 0.7 Kcal/mH° C, a maximum resistible temperature of 1100° C, a coefficient of thermal expansion of less than $2 \times 10^{-6}$, and a very excellent strength. Thus, this ceramic insulating layer is particularly useful as an insulating structure for use with the manifold reactor 200 which requires a superior vibration resisting property and a high strength because it is directly subjected to the vibrations of the engine 100.

EMBODIMENT 9

Cordierite was mixed in a water solution of aluminium primary phosphate using the same mixing ratio as in Embodiment 8 to prepare a slurry. To this slurry was added less than 10 % by weight of one or more acids selected from the group consisting of such common acids as phosphoric acid, hydrochloric acid, and sulfuric acid. Subsequently, to effect effervescence, in the slurry was uniformly dispersed less than 1 % by weight of a powdery metal which yielded hydrogen on chemical reaction with the acids mentioned above and which had been selected from the group consisting of such metals as aluminum, iron, calcium, magnesium, manganese, nickel, tin, and cadmium. The space between the inner wall a and the outer wall b of the double structure was filled with the slurry thus rendered effervescent, and the slurry was fired to form a ceramic insulating layer c. This insulating layer was porous, and had a maximum resistible temperature of 1100° C and a coefficient of thermal expansion of less than $2 \times 10^{-6}$, which were the same as those of the insulating layer of Embodiment 8. On the other hand, this insulating layer had a slightly lower strength than the insulating layer of Embodiment 8, but at the same time had a thermal conductivity of 0.3 – 0.6 Kcal/mH° which was lower than that obtained in Embodiment 8. Thus, this insulating layer is particularly useful as an insulating structure for use with the double exhaust pipe 300, the mufflers 400 and 600, and the insulating cover 700 which are complicated in shape and construction and require an excellent insulating property and a medium degree of strength.

EMBODIMENT 10

Cordierite was mixed in a water solution of aluminium primary phosphate using the same mixing ratio as in Embodiment 8 to prepare a slurry. To this slurry was added less than 10 % by weight of one or more acids selected from the group consisting of such common acids as phosphoric acid, hydrochloric acid, and sulfuric acid. Subsequently, to effect effervescence, in the slurry was uniformly dispersed less than 1 % by weight of a compound which yielded carbon dioxide on chemical reaction with the acids mentioned above and which had been selected from the group consisting of such compounds as calcium carbonate, calcium hydrogen carbonate, sodium carbonate, and magnesium carbonate. The space between the inner wall $a$ and the outer wall $b$ of the double structure was filled with the effervesced slurry, and the slurry was fired to form a porous ceramic insulating layer $c$. This ceramic insulating layer had the same properties as those of the insulating layer of Embodiment 9.

EMBODIMENT 11

Cordierite was mixed in a water solution of aluminium primary phosphate using the same mixing ratio as in Embodiment 8 to prepare a slurry. To this slurry was added less than 10 % by weight of one or more acids selected from the group consisting of such common acids as phosphoric acid, hydrochloric acid, and sulfuric acid. Subsequently, to effect effervescence, in the slurry was uniformly dispersed less than 1 % by weight of a powdery metal which yielded hydrogen on chemical reaction with the acids mentioned above and which had been selected from the group consisting of such metals as aluminum, iron, calcium, magnesium, manganese, nickel, tin, and cadmium, or less than 1 % by weight of a compound which yielded carbon dioxide on chemical reaction with the acids mentioned above and which had been selected from the group consisting of such compounds as calcium carbonate, calcium hydrogen carbonate, sodium carbonate, and magnesium carbonate. Then, to the effervescent slurry was added less than 5 % by weight of a commercial bubble stabilizer such as corn starch, yolk, cellulose acetate, dry blood, IBIT (trade name), and the like. The space between the inner wall $a$ and the outer wall $b$ of the double structure was filled with the slurry thus prepared, and the slurry was fired to form a porous ceramic insulating layer $c$. The bubble stabilizer retarded the speed of effervescence and stabilized the bubbles so that the effervescence was effected in a uniform manner. The insulating layer produced in this way had properties substantially the same as those of the insulating layer of Embodiment 9.

EMBODIMENT 12

Cordierite was mixed in a water solution of aluminium primary phosphate using the same mixing ratio as in Embodiment 8 to prepare a slurry. Then, in the slurry was uniformly dispersed less than 15 % by weight of a material which, upon the solidification of slurry, burned and disappeared (or lost its volume if it did not burn), such as crumpled small paper balls, sawdust or wood chips, spheres of synthetic resins, spheres of synthetic organic substances, and the like. The space between the inner wall $a$ and the outer wall $b$ of the double structure was filled with the slurry thus prepared, and the slurry was fired to form a porous ceramic insulating layer $c$. During the firing, said material such as small paper balls, sawdust or wood chips, synthetic resins, organic substances, and the like, which was included in the slurry, burned and lost its volume, so that the slurry was transformed into a porous ceramic insulating layer. The insulating layer formed in this manner had the same properties as those of the insulating layer of Embodiment 9.

EMBODIMENT 13

Cordierite was mixed in a water solution of aluminium primary phosphate (water content 40 – 60 %), and to the mixture thus formed was added a light-weight aggregate such as perlite (effervesced perlite), effervesced obsidian, and the like, so that there was prepared a slurry having the composition shown in FIG. 12. The space between the inner wall $a$ and the outer wall $b$ of the double structure was filled with the slurry thus prepared, and the slurry was fired to form a ceramic insulating layer. This ceramic insulating layer was porous. The maximum resistible temperature and the coefficient of thermal expansion of this ceramic insulating layer were respectively more than 1100° C and less than $2 \times 10^{-6}$. This insulating layer had a strength which was substantially the same as those of the insulating layers of Embodiment 1, and had a thermal conductivity of 0.3 – 0.6 Kcal/mH° C which was the same as those obtained in Embodiments 9 – 12. Thus, this ceramic insulating layer is particularly useful as an insulating structure for use with the catalyst convertor 500 (both the granular catalyst type and the honeycomb-shaped catalyst type) which requires a high strength and an excellent insulating property.

EMBODIMENT 14

Slurries were prepared by adding to the slurry having the composition of Embodiment 13 the acid or acids and the metal powder reacting with said acid to yield hydrogen which were used in Embodiment 9, or the acid or acids and the compound reacting with said acid to yield carbon dioxide which were used in Embodiment 10, or the bubble stabilizer used in Embodiment 11, or the material used in Embodiment 12 which lost its volume upon the solidification of slurry. The spaces between the inner walls $a$ and the outer walls $b$ of the double structures were filled with the slurries thus prepared, and the slurries were fired to form ceramic insulating layers $c$. Said substances and materials added to the slurry promoted the attainment of porosity in the ceramic insulating layers. These insulating layers had the same properties as those of the insulating layers of Embodiment 6.

In an automobile, there was mounted an exhaust gas purifying system comprising the manifold reactor 200, the exhaust pipe 300, the insulating cover 700, the catalyst convertor 500 using the granular catalyst, the catalyst convertor 500 using the honeycomb-shaped catalyst, and the like which were provided with the insulating structures of Embodiments 1 through 14. The automobile was run 10,000 km on a rugged road to test the performances of said insulating structures. As the result, the ceramic insulating layers $c$ showed no degradation in insulating property and no sign of cracking or pulverization.

The ceramic insulating layers of the above embodiments can be fired if a firing temperature of more than 500° C is employed, and compared with, for instance, the insulating brick which is fired at temperatures of more than 1000° C, they enjoy greatly improved working properties. Moreover, it is an outstanding advantage of these ceramic insulating layers that since they are in the form of slurry before firing, spaces in a double structure having a complicated shape can be readily filled with the slurry so that uniform insulating layers are formed.

Further, it has been proved that the insulating layers of the above embodiments can be manufactured with a material cost about one-fourth that of an insulating layer made of ceramic fiber. The maximum resistible temperature can be increased from 800° C for the ceramic fiber insulating layer to more than 1000° C.

Still further, the insulating layers of the above embodiments have demonstrated that they can sufficiently withstand repeated thermal shocks produced by the alternate application of a temperature of 1000° C and cold water because they have a coefficient of thermal expansion of less than $5.3 \times 10^{-6}$.

Figure 13:
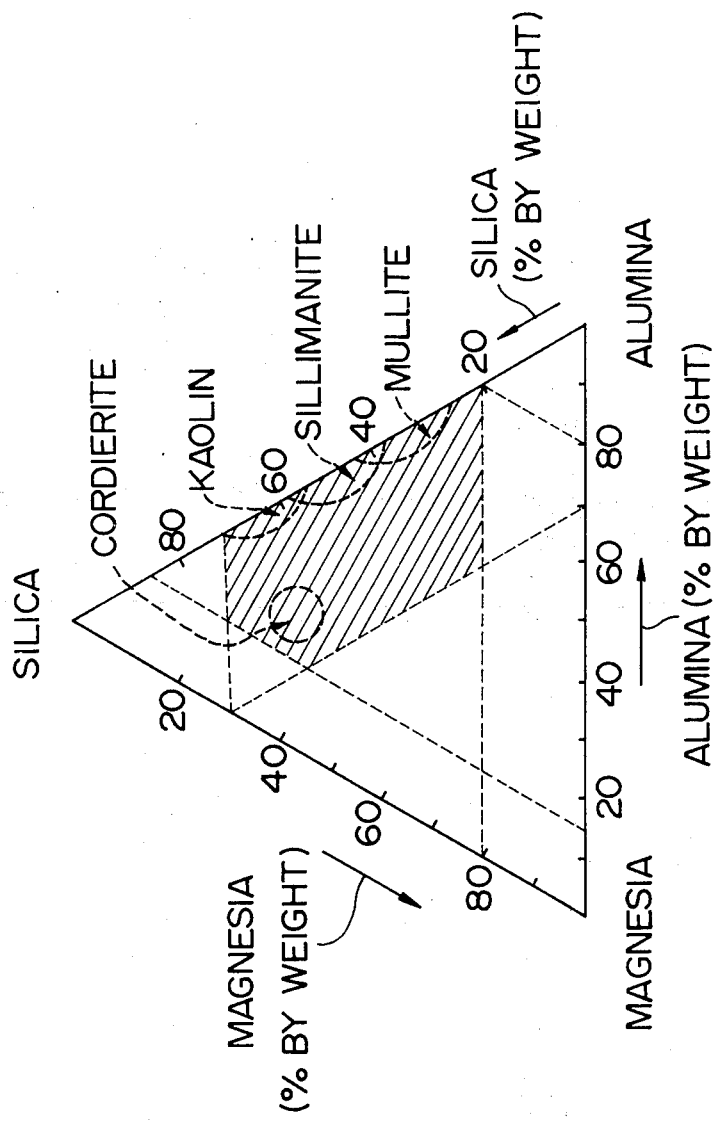
FIG. 13 is a composition diagram showing the compositions of the heat resisting materials used in the present invention, which consist of silica, alumina, and magnesia.

The mullite, sillimanite, and kaolin used as the heat resisting material in the above embodiments consist of $SiO_2$ (silica), $Al_2O_3$ (alumina), and MgO (magnesia), and respectively have the compositions shown in the shaded area in FIG. 13.

Figure 14:
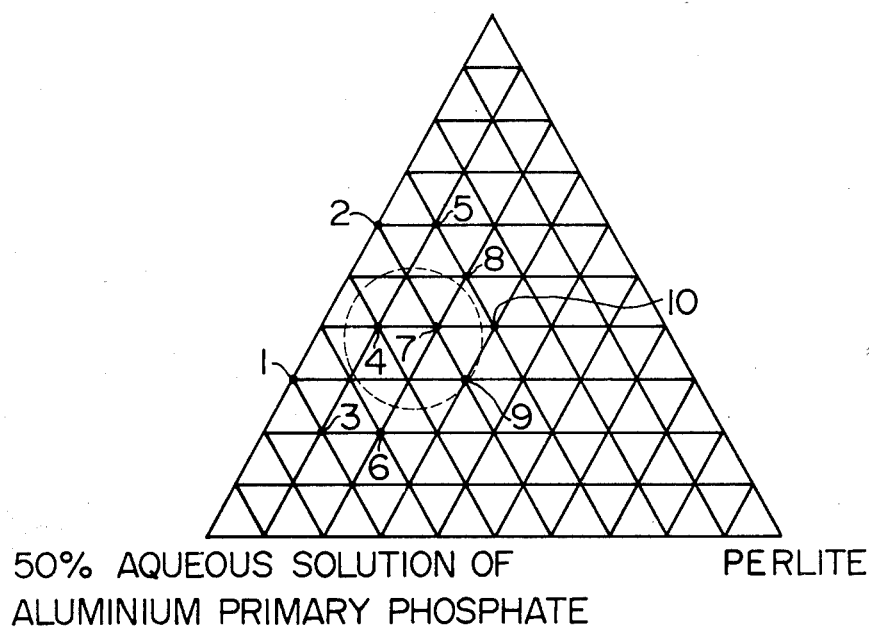
FIG. 14 is a composition diagram showing the compositions used in another embodiment of the insulating structure in accordance with the present invention.

The other embodiments of the present invention will be explained hereunder with reference to FIGS. 14 through 18. The ceramics used in the embodiments shown in FIGS. 14 through 18 were produced by mixing cordierite, perlite [$(Mg,Fe)_2Al_3(Si_4Al_3)O_{13}$], and aluminium primary phosphate $Al(H_2PO_4)_3$, and then firing them. Of these ceramics, the ceramics with the compositions indicated by the dots in FIG. 14 were subjected to various experiments. The results are listed in Table 3. In FIG. 14, each base of the triangle shows the percentages by weight of the substance written at the vertex corresponding to said each base. The percentages (%) are graduated in 10 % increments between the bases and the vertexes with the bases indicating 0 % and the vertexes 100 %. (For example, the dot 4 indicates a composition of 40 % cordierite, 10 % perlite, and 50 % aluminium primary phosphate). In Table 3, the numbers in the leftmost column of No. correspond to the dots in FIG. 14, and a ceramic having a composition indicated by a given one of said numbers is tabled in terms of the heat resisting property, vibration resisting property, filling property, insulating property, thermal expansion property, and overall evaluation. Also in Table 3, the maximum resistible temperature means a temperature (° C) at which the tested ceramic had a percentage of cubical contraction of less than 1 % after a continuous firing of 5 hours. In the column of vibration resisting property, the symbol ⊚ designates a ceramic that passed a test in which the space in a double pipe having an inner diameter of 30 mm. and an outer diameter of 55 mm. was filled with a test specimen, and the test specimen was subjected to a vibration continuously for 5 hours, which vibration had a frequency of 90 HZ and an acceleration of vibration of ±45G (the G indicating acceleration of gravity). The symbol O designates a ceramic which passed the 5-hour continuous test using the frequency of 90 HZ and an acceleration of vibration of ±20G. The symbol × indicates a ceramic which was destroyed or pulverized during the test under the conditions milder than those employed in the two tests above described. The filling property is expressed, by means of viscosity (poise), in terms of the degree of easiness in filling a case shown in FIG. 2 with a particular ceramic, with a vibration being applied to the case. The symbol ⊚ indicates a ceramic easily filled (less than 400 poises), the symbol × a ceramic filled with difficulty (more than 600 poises), and the symbol O a ceramic filled with a medium degree of easiness (400 – 600 poises). The symbol ⊚ in the column of insulating property designates a ceramic whose thermal conductivity at a temperature of 800° C was less than 0.3 Kcal/Hm° C, the symbol O a ceramic whose thermal conductivity at 800° C was in a range of 0.3 – 0.4 Kcal/Hm° C, and the symbol × a ceramic whose thermal conductivity at 800° C was more than 0.5 Kcal/Hm° C. In the column of thermal expansion property, the symbol ⊚ indicates a ceramic which showed a coefficient of thermal expansion of $2 - 3.5 \times 10^{-6}$ when tested in a temperature range of from room temperature to 800° C using a test bar ($5\phi \times 40$ mm) made of said ceramic. The symbol O designates a ceramic which showed a coefficient of thermal expansion of $3.5 - 5 \times 10^{-6}$ under the same test conditions. And the symbol × indicates a ceramic which showed a coefficient of thermal expansion of more than $5 \times 10^{-6}$ under the same test conditions. In the column of overall evaluation, the symbol ⊚ designates a ceramic considered as excellent when evaluated taking into account all the test elements described above, the symbol O a ceramic considered as medium, and the symbol × a ceramic considered as inferior.

Table 3

| | Component (weight %) | | | Properties of Ceramics | | | | | |
|---|---|---|---|---|---|---|---|---|---|
| | | | | | Property | | | | |
| No. | Cordierite | Perlite | Aluminium primary phosphate | Maximum resistible temperature (° C) | Vibration resisting property | Filling property | Insulating property | Thermal expansion property | Evaluation |
| 1 | 30 | 0 | 70 | 1150 | O | ⊚ | × | ⊚ | × |
| 2 | 60 | 0 | 40 | 1100 | ⊚ | ⊚ | × | ⊚ | × |
| 3 | 20 | 10 | 70 | 1150 | O | ⊚ | × | × | × |
| 4 | 40 | 10 | 50 | 1100 | ⊚ | ⊚ | ⊚ | ⊚ | ⊚ |
| 5 | 60 | 10 | 30 | 1100 | ⊚ | × | O | ⊚ | × |
| 6 | 20 | 20 | 60 | 1100 | O | ⊚ | O | × | × |
| 7 | 40 | 20 | 40 | 1050 | ⊚ | ⊚ | ⊚ | ⊚ | ⊚ |
| 8 | 50 | 20 | 30 | 1100 | ⊚ | × | O | ⊚ | × |
| 9 | 30 | 30 | 40 | 1050 | ⊚ | O | ⊚ | O | O |
| 10 | 40 | 30 | 30 | 1050 | ⊚ | × | ⊚ | ⊚ | × |

As is clear from the experimental results tabled above, these ceramics are generally very superior in quality, and have, in particular, high maximum resistible temperatures, excellent vibration resisting properties, distinguished insulating properties, and very small coefficients of thermal expansion. It is noted that particularly the ceramics having the compositions indicated by the dots located in the area surrounded by the broken line in FIG. 14 are superior also in other properties than those mentioned above, and are very suitable to be used as shock absorbing materials for an exhaust gas purifying system which operates under elevated temperature conditions with strong vibrations being applied thereto. The perlite which is a component in the compositions of the ceramics described above may be replaced by obsidian, and the aluminium primary phosphate may be replaced by zinc primary phosphate or magnesium-tetrahydrogen phosphate. In the following description, the ceramics used in the present invention are defined as having the compositions consisting of suitable percentages by weight of a light-weight aggregate (having a maximum resistible temperature of more than 1000° C), cordierite, and phosphate compounds.

Figure 15:
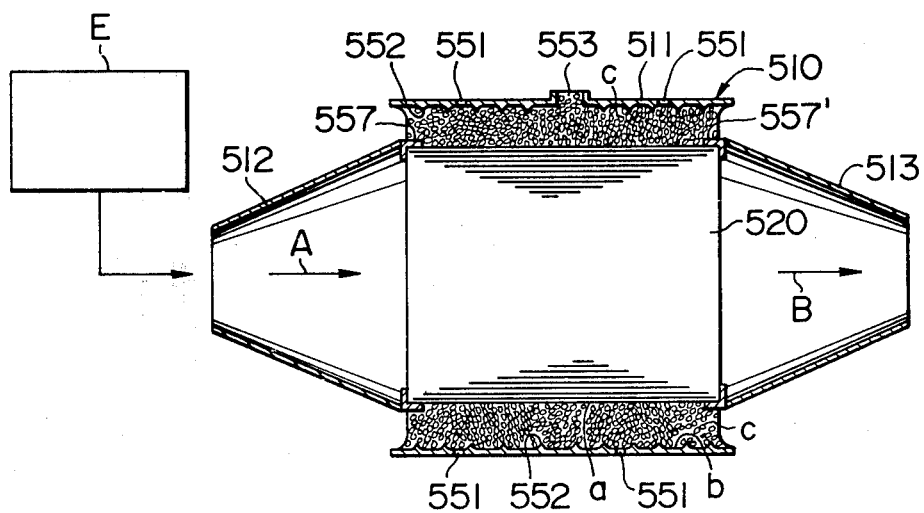
FIGS. 15 through 18 are partly sectional views illustrating catalyst-type exhaust gas purifying systems incorporating insulating structures using the compositions of FIG. 14.

A further embodiment of the present invention will be explained hereunder with reference to FIG. 15. In FIG. 15, the numeral 520 indicates a cylindrical honeycomb in which a plurality of exhaust gas passages (not shown) extend in the axial direction. A catalyst metal is carried on the surfaces of said exhaust gas passages, and the honeycomb 520 has the ability to purify the exhaust gas. Commonly, the honeycomb 520 is made of cordierite, and it is known that the honeycomb 520 has a very small coefficient of thermal expansion. The numeral 510 designates a case which is commonly constructed of a metal and comprises a cylindrical honeycomb container 511, and an introducing portion 512 and a discharging portion 513 both conical in shape and located at the both ends of said honeycomb container 511. A required number of pouring ports 553 and scattering holes 551 are provided in the honeycomb container 511. A plurality of projections 552 are disposed in the inner wall of the honeycomb container 511. The honeycomb 520 is contained in the honeycomb container 511 of the case 510. A space for receiving a ceramic $c$ is formed between an outer wall $a$ of the honeycomb 520 and an inner wall $b$ of the honeycomb container 511. The introducing portion 512 and the discharging portion 513 of the case 510 are securely fixed to the both ends of the outer wall of the honeycomb 520 at their large-diameter ends so that the introducing portion 512 and the discharging portion 513 do not come into direct contact with the honeycomb container 511. The symbol $c$ indicates the ceramic previously described which is placed in said space by a method to be explained later in conjunction with the method of assembly. The ceramic $c$ firmly fuses to the outer wall $a$ of the honeycomb 520 and the inner wall $b$ of the honeycomb container 511 of the case 510. The numerals 557 and 557' designate interposing plates having an annular shape which are respectively interposed between one end of the honeycomb 520 and the large-diameter end of the introducing portion 512 of the case 510 and between the other end of the honeycomb 520 and the large-diameter end of the discharging portion 513 of the case 510. In other words, to the both ends of the honeycomb 520 are securely fixed interposing plates 557 and 557' to which the introducing portion 512 of the case 510 and the discharging portion 513 of the case 510 are respectively fixed securely.

In the construction described above, the exhaust gas from an internal combustion engine E is introduced through the introducing portion 512 of the case 510 as shown by the arrow A, and flows through the passages in the honeycomb 520, and further passes through the discharging portion 513 of the case 510 to be discharged to the outside atmosphere as shown by the arrow B. When the exhaust gas flows through the passages in the honeycomb 520, the harmful components in the exhaust gas such as carbon monoxide, unburned hydrocarbons, and nitrogen oxides are removed by reaction with the catalyst carried on the surfaces of said passages. The exhaust gas entering the introducing portion 512 of the case 510 commonly has a temperature of several hundred degrees (400° – 500° C). Due to the heat of reaction produced by the reaction of said harmful components, the temperature of the honeycomb 520 is increased to 800° C. Particularly, the temperature of the honeycomb 520 rises to more than 800° C when the internal combustion engine E is under a large load and revolves at a high speed. The heat of the honeycomb 520 is transmitted to the ceramic $c$ and the case 510 so that the temperatures of the ceramic $c$ and the case 510 are increased. At the same time, thermal expansion takes place in the ceramic $c$ and the case 510, which expand at the rates corresponding to their respective coefficients of thermal expansion. Thus, if conventional structures and materials are employed, there is a very strong possibility that the ceramic $c$ peels off the honeycomb 520 and the honeycomb container 511 of the case 510 owing to the differences in coefficients of thermal expansion of the honeycomb 520, the ceramic $c$, and the honeycomb container 511 of the case 510. Also the destruction of ceramic $c$ will occur. This poses a serious problem. But actually, in the present invention, the ceramic $c$ never peels off the honeycomb 520 since, as can be seen from Table 3, the ceramic $c$ has the very small coefficient of thermal expansion of $2 - 3.5 \times 10^{-6}$ which is substantially the same as that of the honeycomb 520. The coefficient of thermal expansion of the case 510 is $12 - 14 \times 10^{-6}$ because the case 510 is constructed of a metal. This coefficient of thermal expansion is much different from that of the ceramic $c$. However, thanks to the excellent insulating property of the ceramic $c$ which is readily understandable from Table 3, the heat transmitted from the honeycomb 520 to the honeycomb container 511 of the case 510 is considerably decreased in amount when the heat is transmitted through the ceramic $c$. When the central portion of the honeycomb 520 has a temperature of 800° C, the temperature of the honeycomb container 511 of the case 510 can be kept at about 200° C (in case the ceramic $c$ is 10 mm. in thickness). Thus, the difference between the thermal expansions of the ceramic $c$ and the honeycomb container 511 of the case 510 is made very small so that the peeling of the ceramic $c$ off the honeycomb container 511 can be prevented. Furthermore, a plurality of projections 552 are provided on the inner wall of the honeycomb container 511 of the case 510 as shown in FIG. 15, and the projections 552 cut into the ceramic $c$ so that the peeling of the ceramic $c$ off the honeycomb container 511 of the case 510 can be prevented in a very sure manner. Further, the honeycomb container 511 of the case 510, the introducing portion 512, and the discharging portion 513 are constructed so that the former and the latter two do not come into direct contact thanks to the ceramic $c$ interposed therebetween so that the heats in the latter two (the introducing portion 512 attains a temperature of several hundred degrees which is substantially the same as that of the incoming exhaust gas, while the discharging portion 513 acquires a temperature of about 800° C which is substantially the same as that of the exhaust gas flowing out the honeycomb 520) are not transmitted directly to the former. This construction also serves in preventing the peeling off of the ceramic c. If by any chance the peeling off takes place, the ceramic c does not move by virtue of the projections 552. As regards the destruction of the ceramic c, there is no such a possibility because the ceramic c enjoys a maximum resistible temperature (the temperature at which the ceramic c has a coefficient of cubical contraction of more than 1 % after a 5-hour continuous firing) of more than 1000° C as is apparent from Table 3, and because the vibration resisting property of the ceramic c is very superior. Thus, the honeycomb 520 is supported so securely in the case 510 that, even if it is subjected to the vibrations of an automobile and the like in which it is mounted or to the vibrations of the internal combustion engine E, the honeycomb 520 does not move in the case 510, resulting in complete preclusion of the possibility of its destruction. In order to prove this, the inventor conducted a test in which a burning exhaust gas having a temperature of 950° C - 1000° C was passed through the honeycomb 520, and simultaneously a vibration having an acceleration of vibration of ±45G was applied to the honeycomb 520 for 200 hours. At the conclusion of the test, it was found that the honeycomb 520 had not been destroyed. Additionally in an actual driving test carried out using an automobile, no abnormality was observed in the honeycomb 520 after a drive of 20,000 km. It will be readily noted that the exhaust gas never passes through a location other than the passages in the honeycomb 520 because the outer wall of the honeycomb 520 is surrounded by the ceramic c.

Figure 16:
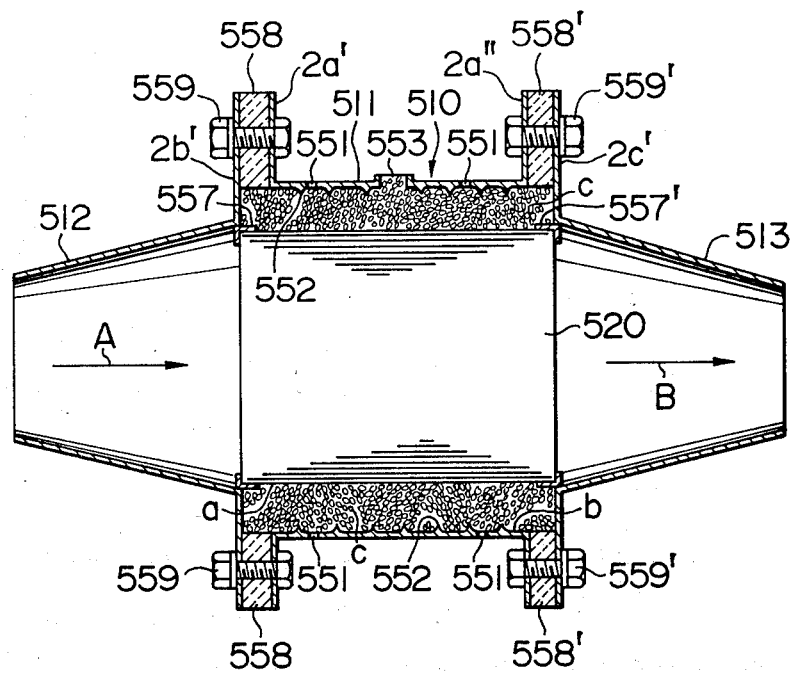
Figure 17:
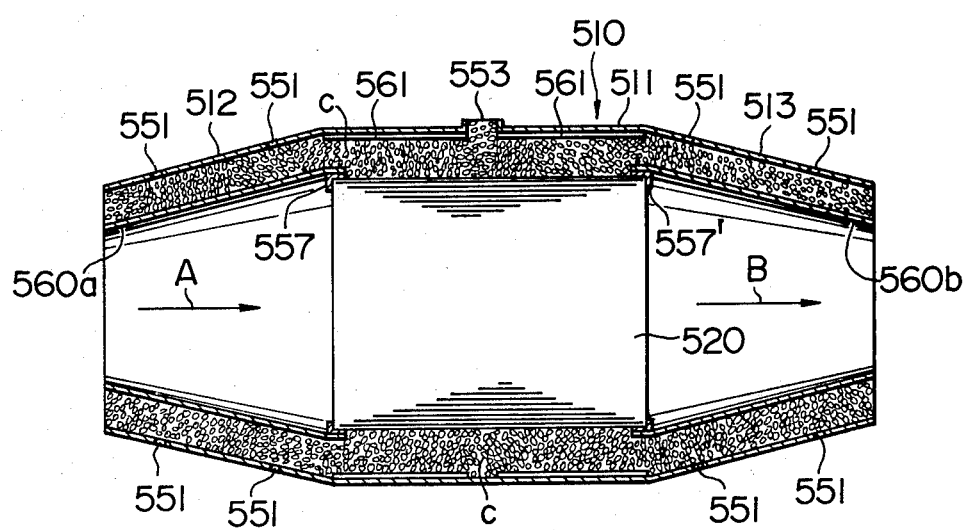

FIGS. 16 and 17 show embodiments that are the developed versions of the embodiment of FIG. 15 for which the explanations have been given in the foregoing. Hereunder, the embodiments of FIGS. 16 and 17 will be explained contrasting them with the embodiment of FIG. 15. In the embodiment shown in FIG. 16, flanges $2a'$ and $2a''$ are arranged at both ends of a honeycomb container 511 of a case 510. Flanges $2b'$ and $2c'$ are disposed opposite to said flanges $2a'$ and $2a''$ at the large-diameter ends of an introducing portion 512 and a discharging portion 513. An insulating material 558 is interposed between one flange $2a'$ of the honeycomb container 511 and the flange $2b'$ of the introducing portion 512, and said flanges $2a'$ and $2b'$ are connected to each other by means of a plurality of bolts 559. An insulating material 558' is interposed between the other flange $2a''$ of the honeycomb container 511 and the flange $2c'$ of the discharging portion 513, and said flanges $2a''$ and $2c'$ are connected to each other by means of a plurality of bolts 559'. The honeycomb container 511 of the case 510 is connected to the introducing portion 512 and the discharging portion 513 through said flanges by means of the bolts 559 and 559'. An interposing plate 557 is interposed between one end of a honeycomb 520 and the introducing portion 512, while an interposing plate 557' is interposed between the other end of the honeycomb 520 and the discharging portion 513. As is apparent, the insulating material pieces 558 and 558' both have an annular shape, and they may be made of a well known insulating material such as ceramic fiber, asbestos, and the like. In the embodiment of FIG. 16, the heat of the honeycomb 520 is insulated by the ceramic c, and the heats of the introducing portion 512 and the discharging portion 513 of the case 510 which are heated by the exhaust gas flowing through them are insulated by the insulating material pieces 558 and 558'. Therefore, the rate of temperature increase in the honeycomb container 511 of the case 510 can be made far lower than that in the embodiment of FIG. 15, so that the temperature of the honeycomb container 511 is limited to about 150° C. Thus, the peeling of the ceramic c off the honeycomb container 511 of the case 510 is prevented more surely to avoid the possibility that the honeycomb 520 is destroyed.

An explanation will be given hereunder of the embodiment shown in FIG. 17. A honeycomb container 511 of a case 510 is formed integrally with an introducing portion 512 and a discharging portion 513. An inner introducing case 560$a$ and an inner discharging case 560$b$ are provided inside the introducing portion 512 and the discharging portion 513. The inner introducing case 560$a$ and the inner discharging case 560$b$ are conical in shape, and their large-diameter ends are fitted to both ends of the outer wall of the honeycomb 520 such that spaces are formed between the inner introducing case 560$a$ and the introducing portion 512 of the case 510 and between the inner discharging case 560$b$ and the discharging portion 513 of the case 510. These spaces are filled with a ceramic c in the same manner as for the space defined by the outer wall of the honeycomb 520 and the inner wall of the honeycomb container 511 of the case 510. The ceramic bodies c in said two spaces form an integral body of the ceramic c. A ceramic fiber 561 is arranged between the honeycomb container 511 of the case 510 and the ceramic c.

In the construction described above, thanks to the insulation provided by the ceramic c, the heats of the honeycomb 520 and the flowing exhaust gas do not directly act on any portion of the case 510, so that the temperature of the case 510 can be maintained at a level substantially the same as that of the temperature of the honeycomb container 511 used in the embodiment of FIG. 16. As a result, the thermal expansion of the case 510 is kept so small as to prevent the peeling of the ceramic c off the case 510. Since the ceramic c takes the form of an integral body and is not simply cylindrical but bag-shaped in configuration, said peeling off can be effectively prevented without using the projections provided on the inner wall of the case 510, in contrast to the embodiments of FIGS. 15 and 16. Furthermore, even if the peeling off occurs, the movement of the ceramic c can be prevented. Needless to say, a more favorable result can be obtained by arranging the projections on the inner wall of the case 510. Having a flexibility, the ceramic fiber 561 plays the role of absorbing the thermal expansion of said case 510. It goes without saying that the ceramic fiber 561 may be employed in the embodiments of FIGS. 15 and 16 in the same manner as in this embodiment. Instead of the ceramic fiber 561, a wire gauze made of a stainless steel may be used. Further, the honeycomb container 511 of the case 510, the introducing portion 512, and the discharging portion 513 may be manufactured as separate parts which are bolted or otherwise connected to one another afterward.

Figure 18:
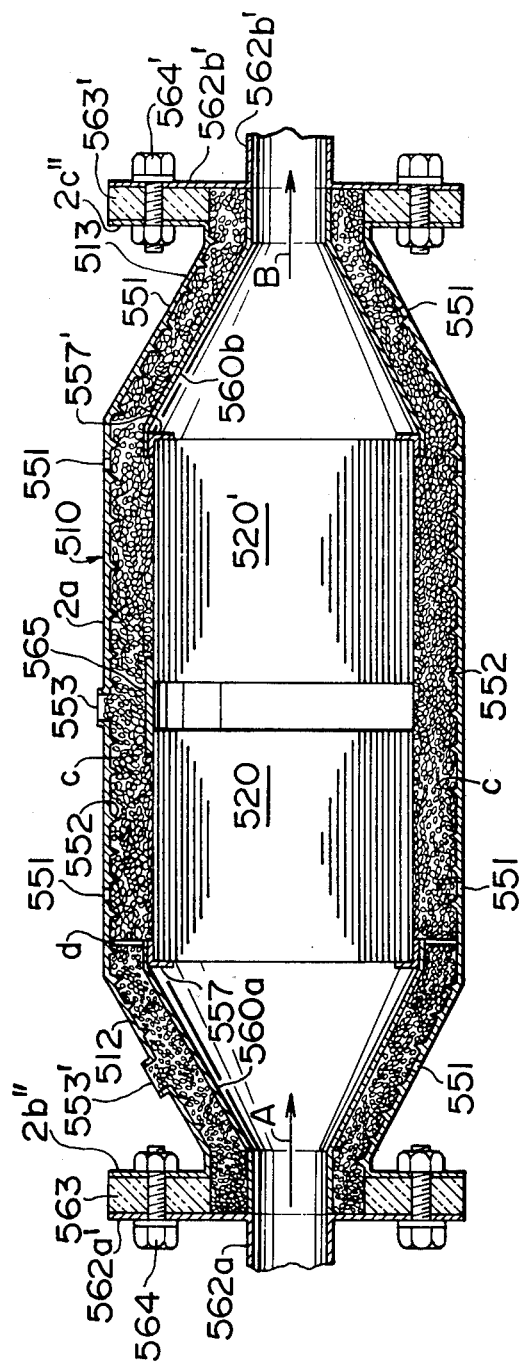

In the embodiments of FIGS. 16 and 17 which have been described above, the heat of the exhaust gas flowing in the introducing portion 512 of the case 510 and the heat of the exhaust gas flowing out the discharging portion 513 are prevented from being directly transmitted to the honeycomb container 511. Commonly, the introducing portion 512 and the discharging portion 513 of the case 510 are connected to exhaust pipes leading to the exhaust part of an internal combustion engine. It is also a difficult problem to avoid a direct transmission of the heats of said exhaust pipes to the honeycomb container 511 of the case 510. The embodiment shown in FIG. 18 is an improved version of the embodiment of FIG. 17, and solves this problem. Flanges 2b'' and 2c'' are provided on the surfaces of the ends opposite to the large-diameter ends, of an introducing portion 512 and a discharging portion 513 of a case 510. Of the exhaust pipes mentioned above, an exhaust pipe 562a on the introducing side has a flange 562a' opposite to the flange 2b'' of the introducing portion 512, and an exhaust pipe 562b on the discharging side has a flange 562b' opposite to the flange 2c'' of the discharging portion 513. An insulating material 563 is interposed between the flange 562a' of the exhaust pipe 562a on the introducing side and the flange 2b'' of the introducing portion 512, so that said flanges 562a' and 2b'' are connected to each other by means of a plurality of bolts 564. Likewise, an insulating material 563' is interposed between the flange 562b' of the exhaust pipe 562b on the discharging side and the flange 2c'' of the discharging portion 513, so that said flanges 562b' and 2c'' are connected to each other by means of a plurality of bolts 564'. As the insulating material pieces 563 and 563', the same ones as those employed in the embodiment of FIG. 16 may be used. In the embodiment of FIG. 18, two honeycombs 520 and 520' are contained in a honeycomb container 511 of a case 510, and a thin ring 565 is fitted to the outer wall of the case 510 at a position in the vicinity of the two opposing ends of the honeycombs 520 and 520'. The ceramic used is divided into two portions, i.e., the ceramic c' filled in a space between an introducing portion 512 of the case 510 and an inner introducing case 560a, and a ceramic c filled in the other part of the insulating structure, and a small amount of space d is formed between the ceramic c' and the ceramic c. In connection with this construction, two pouring ports are arranged in the case 510. A pouring port 553 is disposed in the honeycomb container 511, while a pouring port 553' is disposed in the introducing portion 512. Projections 552 are provided on the inner wall of the case 510, covering all of the honeycomb container 511, the introducing portion 512, and a discharging portion 513. In the space d may be placed such a material as ceramic fiber, a material which burns under high temperature conditions at the time of the solidification of the ceramic bodies c and c' to transform into ashes, and the like.

In the construction described above, the exhaust pipes are heated by the heat of the exhaust gas passing through them. The exhaust pipe 562a on the introducing side acquires a temperature of several hundred degrees (400°–500° C) which is substantially the same as the temperature of the inner introducing case 560a. The exhaust pipe 562b on the discharging side attains a temperature of about 800° C which is substantially the same as the temperature of the inner discharging case 560b (hence the honeycombs 520 and 520'). The heats of the above-mentioned parts are transmitted to the introducing portion 512 and the discharging portion 513 of the case 510 while being insulated by the insulating material pieces 563 and 563'. Thus, all the heats of the exhaust gas and the honeycombs 520 and 520' are transmitted to the case 510 while being insulated. It is possible to keep the temperature of the case 510 below 150° C even if the honeycombs 520 and 520' attain a temperature of 800° C, so that the thermal expansion of the case 510 can be made very small. In the construction shown in FIG. 18, the space d is capable of absorbing the difference between the thermal expansions of the ceramic bodies c and c'. The ceramic c' acquires a temperature of several hundred degrees because, as described previously, the exhaust gas being introduced in the direction of the arrow A has such a temperature. On the other hand, the ceramic c attains a temperature of about 800° C because the honeycombs 520 and 520' and the exhaust gas being discharged as indicated by the arrow B have such temperatures. Although the ceramic bodies c and c' enjoy small coefficients of thermal expansion, it is not avoidable that there occurs a certain difference between the thermal expansions of the ceramic bodies c and c'. This difference is absorbed by the space d. The projections 552 arranged on the inner walls of the introducing portion 512 and the discharging portion 513 of the case 510 serve, in the same manner as the projections 552 provided on the inner wall of the honeycomb container 511, to prevent the peeling of the ceramic bodies c and c' off the case 510, and play the role of limiting the movement of the ceramic bodies c and c' if the peeling off takes place.

The catalyst-type exhaust gas purifying system in accordance with the present invention has been described with reference to the embodiments thereof, and its outstanding feature resides in that the ceramic bodies c and c' having the special composition are used.

I claim:

1. A high temperature insulating mass, comprising a double walled structure and a porous ceramic insulating layer provided in a space between the two walls of said double walled structure, said porous ceramic insulating layer having been formed by filling said space with a slurry containing a heat resistant material, a water solution of an acid, aluminum dihydrogen orthophosphate and a powdery metal capable of reacting with said water solution to produce hydrogen gas at room temperature, and firing said slurry after the production of hydrogen gas to fix said hydrogen gas and thereby forming the porous ceramic insulating layer, said heat resistant material consisting essentially of 20 to 70% by weight of silicon dioxide, 15 to 85% by weight of aluminum oxide and 0 to 30% by weight of magnesium oxide.

2. A high temperature insulating material according to claim 1 wherein the slurry is fired at a temperature of at least 500° C.

3. A high temperature insulating structure in accordance with claim 1 in which said heat resistant material is cordierite.

4. A high temperature insulating mass as defined in claim 1, wherein said powdery metal is selected from the group consisting of aluminum, iron, calcium, magnesium, nickel, tin and cadmium.

5. A high temperature insulating material according to claim 4, wherein the amount of powdery metal is less than 1% of the slurry by weight.

6. A high temperature insulating mass as defined in claim 4, wherein said slurry further includes at least one acid selected from the group consisting of phosphoric acid, hydrochloric acid and sulfuric acid to positively produce said hydrogen gas by reaction with said powdery metal.

7. A high temperature insulating mass comprising a double walled structure and a porous ceramic insulating layer provided in a space between the two walls of said double walled structure, said porous ceramic insulating layer having been formed by filling said space with a slurry containing a heat resistant material, a water solution of an acid, aluminum dihydrogen orthophosphate and an inorganic metal carbonate compound capable of reacting with said water solution to produce carbon dioxide gas at room temperature and firing said slurry to fix said carbon dioxide gas and thereby forming the porous ceramic insulating layer, said heat resistant material consisting essentially of 20 to 70% by weight of silicon dioxide, 15 to 85% by weight of aluminum oxide and 0 to 30% by weight of magnesium oxide.

8. A high temperature insulating material according to claim 7, wherein the slurry is fired at a temperature of at least 500° C.

9. A high temperature insulating structure in accordance with claim 7 in which said heat resistant material is cordierite.

10. A high temperature insulating mass as defined in claim 7, wherein said carbonate compound is selected from the group consisting of calcium carbonate, calcium hydrogen carbonate, sodium carbonate and magnesium carbonate.

11. A high temperature insulating mass as defined in claim 10, wherein said slurry further includes at least one acid selected from the group consisting of phosphoric acid, hydrochloric acid and sulfuric acid to produce said carbon dioxide gas by reaction with said carbonate.

12. A high temperature insulating material according to claim 10, wherein the amount of carbonate is less than 1% of the slurry by weight.

* * * * *